(12) United States Patent
Inoue et al.

(10) Patent No.: US 12,095,239 B2
(45) Date of Patent: Sep. 17, 2024

(54) GAS-INSULATED SWITCHGEAR

(71) Applicant: Mitsubishi Electric Corporation, Tokyo (JP)

(72) Inventors: Naoaki Inoue, Tokyo (JP); Takahiro Mori, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 113 days.

(21) Appl. No.: 17/904,959

(22) PCT Filed: Apr. 17, 2020

(86) PCT No.: PCT/JP2020/016850
§ 371 (c)(1),
(2) Date: Aug. 25, 2022

(87) PCT Pub. No.: WO2021/210159
PCT Pub. Date: Oct. 21, 2021

(65) Prior Publication Data
US 2023/0163577 A1    May 25, 2023

(51) Int. Cl.
*H02B 13/035* (2006.01)
*H02B 13/045* (2006.01)
*H02B 13/075* (2006.01)

(52) U.S. Cl.
CPC ....... *H02B 13/0352* (2013.01); *H02B 13/045* (2013.01); *H02B 13/075* (2013.01)

(58) Field of Classification Search
CPC .. H02B 13/02; H02B 13/035; H02B 13/0352; H02B 13/0354; H02B 13/075
See application file for complete search history.

(56) References Cited

U.S. PATENT DOCUMENTS 6,518,531 B2 *   2/2003   Arioka ................. H02B 13/035
                                                      218/120
8,717,742 B2 *   5/2014   Kim ..................... H02B 13/035
                                                      361/620

(Continued)

FOREIGN PATENT DOCUMENTS

CN    206865005 U      1/2018
EP      3641082 B1 *   4/2022   ............... H02B 1/20

(Continued)

OTHER PUBLICATIONS

International Search Report (PCT/ISA/210) with English translation and Written Opinion (PCT/ISA/237) mailed on Jul. 21, 2020, by the Japan Patent Office as the International Searching Authority for International Application No. PCT/JP2020/016850.

(Continued)

*Primary Examiner* — Robert J Hoffberg
(74) *Attorney, Agent, or Firm* — BUCHANAN INGERSOLL & ROONEY PC

(57) ABSTRACT

The present disclosure makes it possible to reduce intervals between device units placed in a gas-insulated switchgear, thus achieving size reduction of the gas-insulated switchgear. A gas-insulated switchgear includes: a device housing having an operation door; a sealed container placed inside the device housing; and a circuit breaker unit and a ground switch unit attached to a side surface of the sealed container opposed to the operation door, via flange portions. A distance from the operation door to the side surface of the sealed container opposed to the operation door is different between a part where the circuit breaker unit is attached and a part where the ground switch unit is attached, so as to avoid interference between the circuit breaker unit and the ground switch unit.

13 Claims, 5 Drawing Sheets

(56) References Cited

U.S. PATENT DOCUMENTS

| | | | |
|---|---|---|---|
| 10,522,982 B2 | 12/2019 | Lu et al. | |
| 11,095,099 B2* | 8/2021 | Abe | H02B 13/035 |
| 2013/0050905 A1* | 2/2013 | Kim | H02B 13/045 |
| | | | 361/608 |
| 2020/0328580 A1* | 10/2020 | Inoue | H02B 1/20 |

FOREIGN PATENT DOCUMENTS

| | | |
|---|---|---|
| JP | H0982183 A | 3/1997 |
| JP | 2002354617 A | 12/2002 |
| JP | 2007336658 A | 12/2007 |
| JP | 2014099381 A | 5/2014 |

OTHER PUBLICATIONS

Extended European Search Report dated May 11, 2023, issued in the corresponding European Patent Application No. 20930980.6, 10 pages.

\* cited by examiner

Comparative Art

GAS-INSULATED SWITCHGEAR

TECHNICAL FIELD

The present disclosure relates to a gas-insulated switchgear.

BACKGROUND ART

A gas-insulated switchgear is switch equipment that includes device units such as a circuit breaker unit, a disconnector unit, and a ground switch unit and is configured such that main circuit parts subjected to high voltages are placed in a sealed container filled with an insulation gas such as sulfur hexafluoride ($SF_6$). Since the insulation gas is used in the sealed container, the main circuit parts of the device units can be arranged closely to each other, whereby size reduction can be achieved.

In such a gas-insulated switchgear, the circuit breaker unit, the disconnector unit, the ground switch unit, and the like are attached to a side surface of the sealed container via flange portions of the respective device units.

For simplifying the structure of the gas-insulated switchgear, in general, the side surface of the sealed container is formed to be flat and the device units are attached in a vertical line on a flat plane (see, for example, Patent Document 1).

CITATION LIST

Patent Document

Patent Document 1: Japanese Laid-Open Patent Publication No. 2007-336658

SUMMARY OF THE INVENTION

Problems to be Solved by the Invention

In the gas-insulated switchgear, a plurality of device units such as the circuit breaker unit, the disconnector unit, and the ground switch unit are attached in a vertical line on the side surface of the sealed container via the flange portions.

At this time, the main circuit parts placed inside the sealed container and operation mechanisms of the device units placed outside the sealed container need to be arranged so as not to contact between the adjacent device units.

Regarding one device unit, it is assumed that the vertical-direction sizes of the operation mechanism placed outside the sealed container and the main circuit part placed inside the sealed container are different from each other, e.g., the operation mechanism is larger than the main circuit part. In this case, in order to prevent contact between the operation mechanisms of the adjacent device units, the device units need to be arranged with a widened interval therebetween in accordance with the sizes of the operation mechanisms.

Meanwhile, since the main circuit part and the operation mechanism form the same device unit, the main circuit parts smaller than the operation mechanisms are also arranged with the same interval therebetween. In other words, the main circuit parts are arranged with an interval larger than necessary, thus causing a problem of hampering size reduction of the gas-insulated switchgear.

The present disclosure has been made to solve the above problem, and an object of the present disclosure is to make it possible to reduce intervals between device units placed in a gas-insulated switchgear, thus achieving size reduction of the gas-insulated switchgear.

Solution to the Problems

A gas-insulated switchgear according to the present disclosure includes: a device housing having an operation door; a sealed container placed inside the device housing; and a circuit breaker unit and a ground switch unit attached to a side surface of the sealed container opposed to the operation door, via flange portions, wherein a distance from the operation door to the side surface of the sealed container opposed to the operation door is different between a part where the circuit breaker unit is attached and a part where the ground switch unit is attached.

Effect of the Invention

According to the present disclosure, it becomes possible to reduce intervals between the device units, thus achieving size reduction of the gas-insulated switchgear.

DESCRIPTION OF EMBODIMENTS

Figure 1:
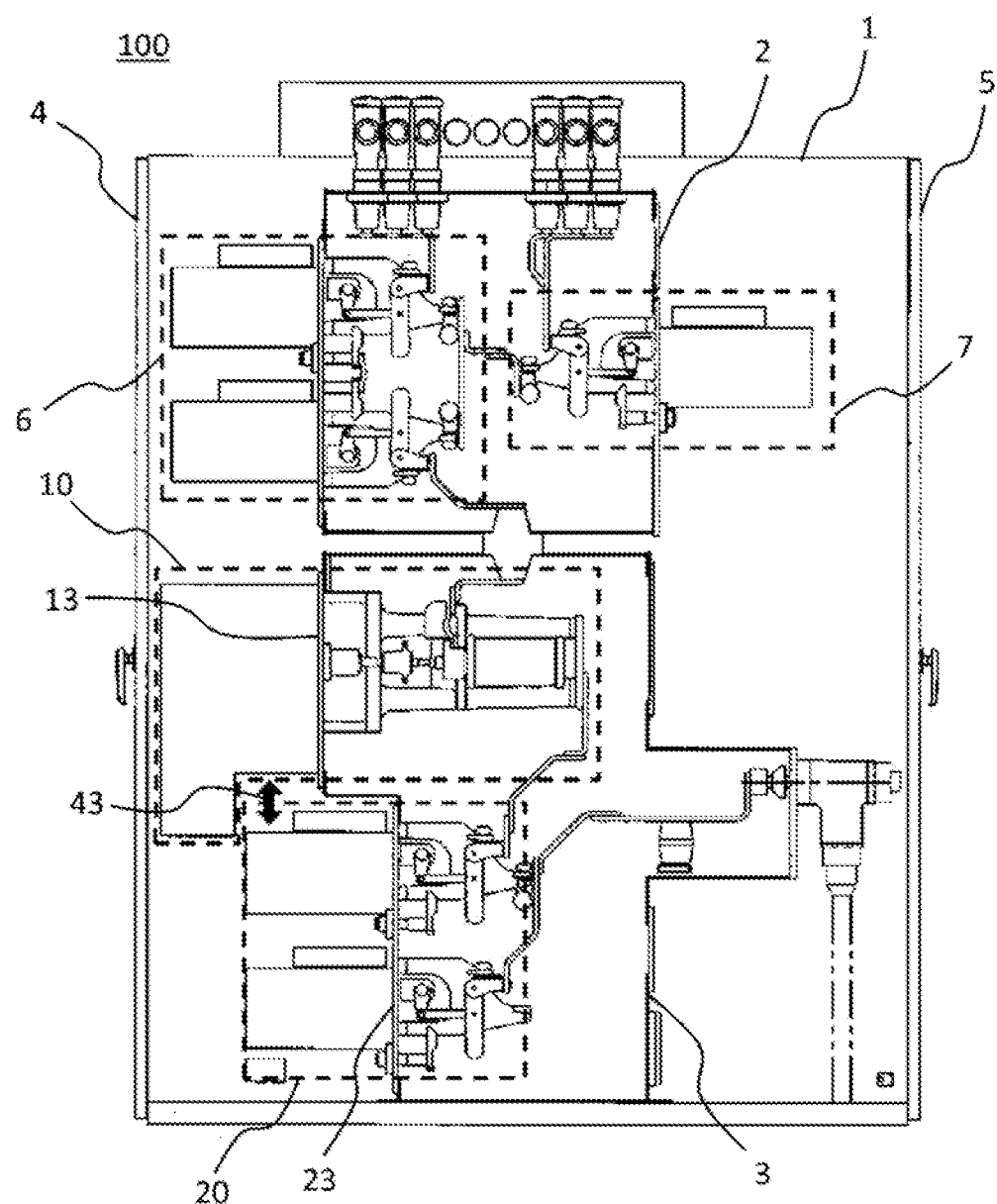
FIG. 1 is a side sectional view of a gas-insulated switchgear in embodiment 1.

In the description of embodiments and the drawings, parts denoted by the same reference characters represent the same or corresponding parts.

Embodiment 1

Figure 2:
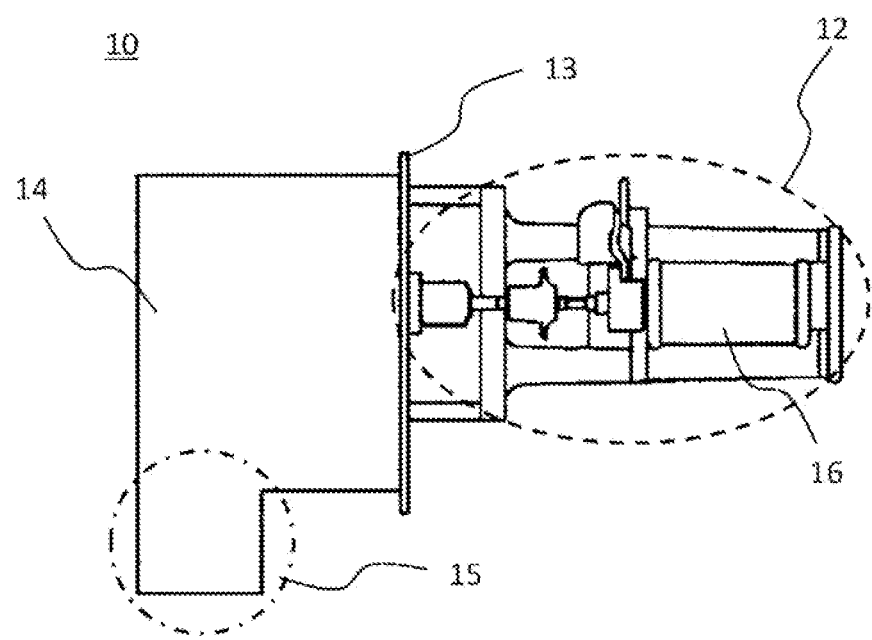
FIG. 2 is a side sectional view of a circuit breaker unit in embodiment 1.
Figure 3:
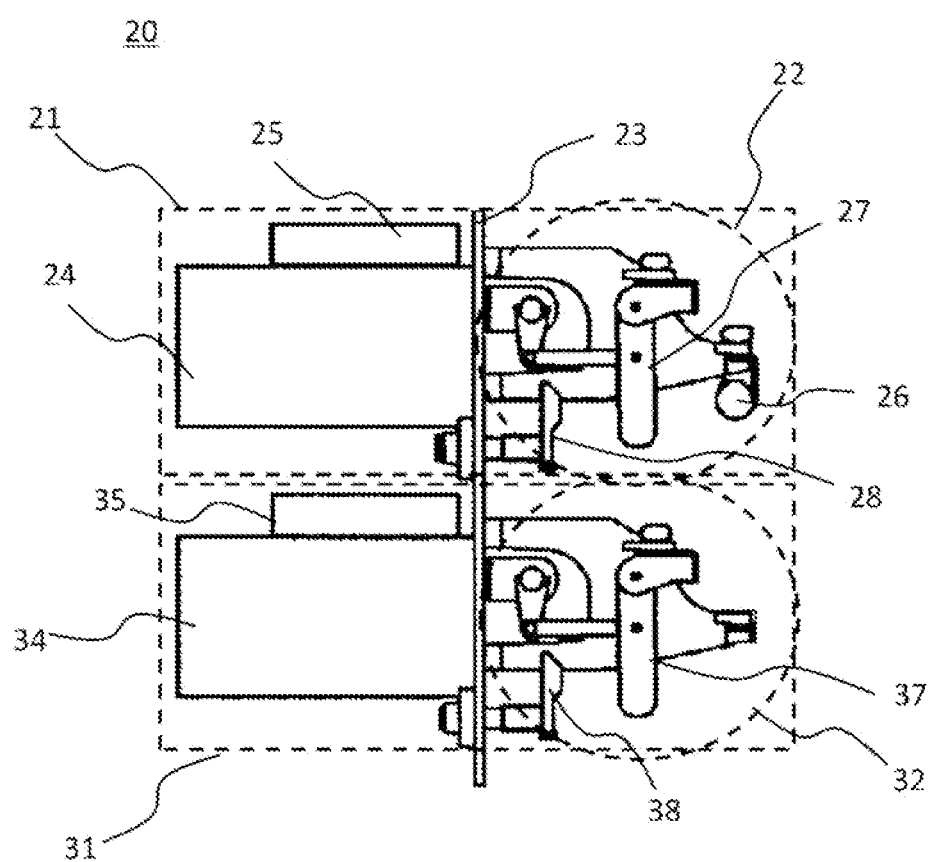
FIG. 3 is a side sectional view of a ground switch unit in embodiment 1.
Figure 4:
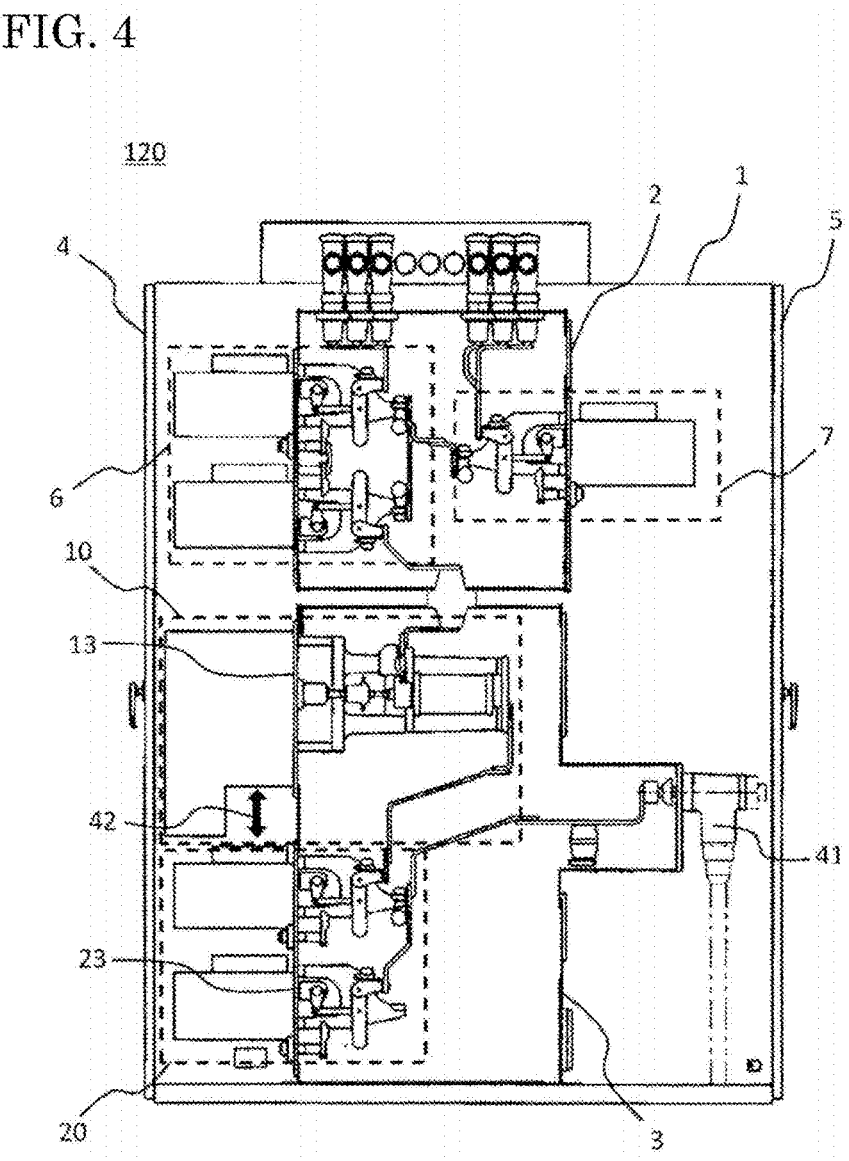
FIG. 4 is a side sectional view of a gas-insulated switchgear.

Embodiment 1 will be described with reference to FIG. 1 to FIG. 4. FIG. 1 is a side sectional view of a gas-insulated switchgear according to embodiment 1, and FIG. 2 and FIG. 3 are side sectional views of a circuit breaker unit and a ground switch unit placed in the gas-insulated switchgear. FIG. 4 is a side sectional view of a gas-insulated switchgear for comparison.

First, with reference to FIG. 1 to FIG. 3, the structure of a gas-insulated switchgear 100 according to embodiment 1 will be described.

FIG. 1 is a side sectional view of the gas-insulated switchgear 100 according to embodiment 1. As shown in FIG. 1, the gas-insulated switchgear 100 is configured such that device units are placed in the device housing 1, and an operation door 4 is provided at a left side surface of the device housing 1 while a back door 5 is provided at a right side surface.

The gas-insulated switchgear 100 has, inside thereof, sealed containers 2, 3 filled with an insulation gas such as sulfur hexafluoride ($SF_6$). Here, an example in which two sealed containers 2, 3 are provided at upper and lower stages will be described.

A ground switch unit 6 switchable to a disconnector is provided at a side surface of the upper sealed container 2 opposed to the operation door 4, via a flange portion protruding at a center part. Similarly, a back-side ground switch unit 7 switchable to a disconnector is provided at a side surface of the sealed container 2 opposed to the back door 5, via a flange portion.

The upper sealed container 2 and device units placed in the upper sealed container 2 of the gas-insulated switchgear 100 in embodiment 1 shown in FIG. 1 are configured in the same manner as in a gas-insulated switchgear 120 shown in FIG. 4 described later for comparison with the gas-insulated switchgear 100 of embodiment 1, and do not represent any characteristics of the present disclosure. Therefore, description about the upper sealed container 2 is omitted below.

Of the side surfaces of the lower sealed container 3, at a side surface opposed to the operation door 4, a circuit breaker unit 10 and a ground switch unit 20 are attached so as to be arranged at upper and lower positions, via flange portions protruding from center parts, respectively.

The configurations, operations, and the like of the circuit breaker unit 10 and the ground switch unit 20 which are placed in the sealed container 3 and used in embodiment 1 will be described with reference to FIG. 2 and FIG. 3.

FIG. 2 is a side sectional view of the circuit breaker unit 10. As shown in FIG. 2, a protruding plate-shaped flange portion 13 is formed at a center part of the circuit breaker unit 10. The flange portion 13 is attached to a side surface of the sealed container 3 and the circuit breaker unit 10 is placed at the sealed container 3.

An operation mechanism 14 is provided at the left of the flange portion 13 on the drawing sheet of FIG. 2 and is placed outside the sealed container 3. On the other hand, a part enclosed by an elliptic broken line at the right of the flange portion 13 on the drawing sheet is the main circuit part 12 and is placed inside the sealed container 3. A vacuum interrupter 16 is provided in the main circuit part 12.

The operation mechanism 14 stores an operation device and the like for operating the main circuit part 12. The operation mechanism 14 stores a spring operation mechanism including a large-sized energized spring for operating the vacuum interrupter 16 at high speed, and has a protrusion 15 protruding downward of the operation mechanism 14 as shown in a round dotted-dashed line.

FIG. 3 is a side sectional view of a ground switch unit 20. As shown in rectangular broken lines in FIG. 3, the ground switch unit 20 includes two ground switch units 21, 31 having at least ground switch functions and arranged as a pair at upper and lower positions, such that the first ground switch unit 21 is switchable to a disconnector and the second ground switch unit 31 is not switchable to a disconnector. These units are joined by a shared flange portion 23 at their respective center parts.

The switchable first ground switch unit 21 and the non-switchable second ground switch unit 31 have operation mechanisms 24, 34 at the left of the flange portion 23 on the drawing sheet. The operation mechanisms 24, 34 are placed outside the sealed container 3.

Parts enclosed in round broken lines at the right of the flange portion 23 on the drawing sheet are main circuit parts 22, 32. The main circuit parts 22, 32 are placed inside the sealed container 3.

The operation mechanisms 24, 34 have circuit boards 25, 35 for controlling the operation mechanisms 24, 34. In many cases, the circuit boards 25, 35 are placed at the upper parts of the operation mechanisms 24, 34.

The main circuit part 22 of the switchable first ground switch unit 21 includes a disconnector terminal 26, a ground terminal 28, and a movable conductor 27. The movable conductor 27 performs switching of a conduction state between the disconnector terminal 26 and the ground terminal 28. Thus, the first ground switch unit 21 has both functions as a disconnector and a ground switch through switching of the movable conductor 27.

In the non-switchable second ground switch unit 31, the main circuit part 32 includes only a ground terminal 38 and a movable conductor 37 and thus does not include a disconnector terminal unlike the first ground switch unit 21. Therefore, the second ground switch unit 31 has only a ground switch function without having a disconnector function.

In the above description of embodiment 1, it is described that the ground switch unit 20 includes the first ground switch unit 21 and the second ground switch unit 31. However, without limitation thereto, a configuration having only one of the first ground switch unit 21 and the second ground switch unit 31 may be employed, and also in this case, the same effects can be provided.

The circuit breaker unit 10 and the ground switch unit 20 are placed at the side surface of the sealed container 3 opposed to the operation door 4, via their respective flange portions 13, 23.

In the gas-insulated switchgear 100 of embodiment 1 shown in FIG. 1, a step is formed on the side surface opposed to the operation door 4, of the side surfaces of the sealed container 3. As seen from the operation door 4 side, on the same side surface of the sealed container 3, the part where the flange portion 23 of the ground switch unit 20 is attached is located on the back side relative to the part where the flange portion 13 of the circuit breaker unit 10 is attached.

Here, the shapes of the circuit breaker unit 10 and the ground switch unit 20 placed at the above stepped side surface of the sealed container 3 will be discussed.

In the ground switch unit 20 of embodiment 1, as shown in FIG. 1 and FIG. 3, the height-direction sizes of the two operation mechanisms 24, 34 located outside the sealed container 3 and the height-direction sizes of the two main circuit parts 22, 32 located inside the sealed container 3 are considered to be almost equal when compared to each other.

On the other hand, in the circuit breaker unit 10 shown in FIG. 1 and FIG. 2, when the height-direction sizes of the operation mechanism 14 and the main circuit part 12 are compared to each other, the operation mechanism 14 has the protrusion 15 storing the spring operation mechanism and the height-direction size of the operation mechanism 14 is larger than that of the main circuit part 12.

Therefore, as in the gas-insulated switchgear 100 of embodiment 1 shown in FIG. 1, on the side surface of the sealed container 3, the part where the flange portion 23 of the ground switch unit 20 is attached is located on the back side relative to the part where the circuit breaker unit 10 is attached as seen from the operation door 4 side, so that the protrusion 15 of the circuit breaker unit 10 and the operation mechanism 24 of the first ground switch unit 21 do not contact with each other and thus interference therebetween can be avoided.

As a result, as shown in FIG. 1, the circuit breaker unit 10 and the ground switch unit 20 can be arranged with a narrowed interval therebetween at a part shown by an arrow 43.

In embodiment 1, it has been described that the operation mechanism 14 of the circuit breaker unit 10 has the protrusion 15 and the height-direction size of the operation mechanism 14 of the circuit breaker unit 10 is larger than that of the main circuit part 12 as shown in FIG. 1 and FIG. 2. Conversely, also in a case where the height-direction size of the main circuit part 12 is larger than that of the operation mechanism 14 of the circuit breaker unit 10, by using the same method, the main circuit parts 12, 22 of the circuit breaker unit 10 and the ground switch unit 20 do not contact with each other and thus interference therebetween can be avoided.

In embodiment 1, it has been described that the operation mechanism 14 of the circuit breaker unit 10 has the protrusion 15 toward the ground switch unit 20 as shown in FIG. 1. Conversely, also in a case where the operation mechanism 24 of the ground switch unit 20 has a protrusion toward the circuit breaker unit 10, by using the same method, they can be prevented from contacting with each other and thus interference therebetween can be avoided. In addition, also in a case where a protrusion is formed on the main circuit part of the circuit breaker unit 10 or the ground switch unit 20, by using the same method, they can be prevented from contacting with each other and thus interference therebetween can be avoided.

The gas-insulated switchgear 120 shown in FIG. 4 is for comparison with the gas-insulated switchgear 100 shown in FIG. 1, and the flange portions 13, 23 of the circuit breaker unit 10 and the ground switch unit 20 are attached to a flat side surface of the sealed container 3 for simplifying the structure.

In other words, the circuit breaker unit 10 and the ground switch unit 20 are placed so as to be aligned with each other backward as seen from the operation door 4 side.

As described above, in the ground switch unit 20, the height-direction sizes of the operation mechanisms 24, 34 placed outside the sealed container 3 and the main circuit parts 22, 32 placed inside the sealed container 3 are almost equal to each other, whereas in the circuit breaker unit 10, since the operation mechanism 14 has the protrusion 15, the height-direction size of the operation mechanism 14 placed outside the sealed container 3 is larger than that of the main circuit part 12 placed inside the sealed container 3.

Therefore, as in the gas-insulated switchgear 120 shown in FIG. 4, when the circuit breaker unit 10 and the ground switch unit 20 are placed at the same distance as seen from the operation door 4 side, they need to be arranged with a widened interval therebetween at a part shown by an arrow 42 in FIG. 4 so as to prevent contact and interference between the protrusion 15 of the circuit breaker unit 10 and the operation mechanism 24 of the first ground switch unit 21 of the ground switch unit 20 or between the protrusion 15 and the circuit board 25 on the operation mechanism 24.

On the other hand, the main circuit parts 12, 22, 32 of the circuit breaker unit 10 and the ground switch unit 20, which are placed inside the sealed container 3, do not have such protrusions 15, and therefore need not be arranged with a widened interval. Nevertheless, as described above, since the operation mechanisms 14, 24, 34 placed outside the sealed container 3 need to be arranged with a widened interval, the main circuit parts 12, 22, 32 arranged with the same interval as the operation mechanisms 14, 24, 34 end up having an interval widened more than necessary.

As described above, in the gas-insulated switchgear 100 shown in embodiment 1, since the interval between the circuit breaker unit 10 and the ground switch unit 20 can be narrowed, the sealed container 3 can be made small, whereby the gas-insulated switchgear 100 can be downsized. At the same time, conductors connecting from a power cable 41 to the main circuit parts 22, 32 of the ground switch unit 20 and the like can be shortened, whereby power loss is reduced and heat generation in the gas-insulated switchgear 100 can be suppressed.

Embodiment 2

Figure 5:
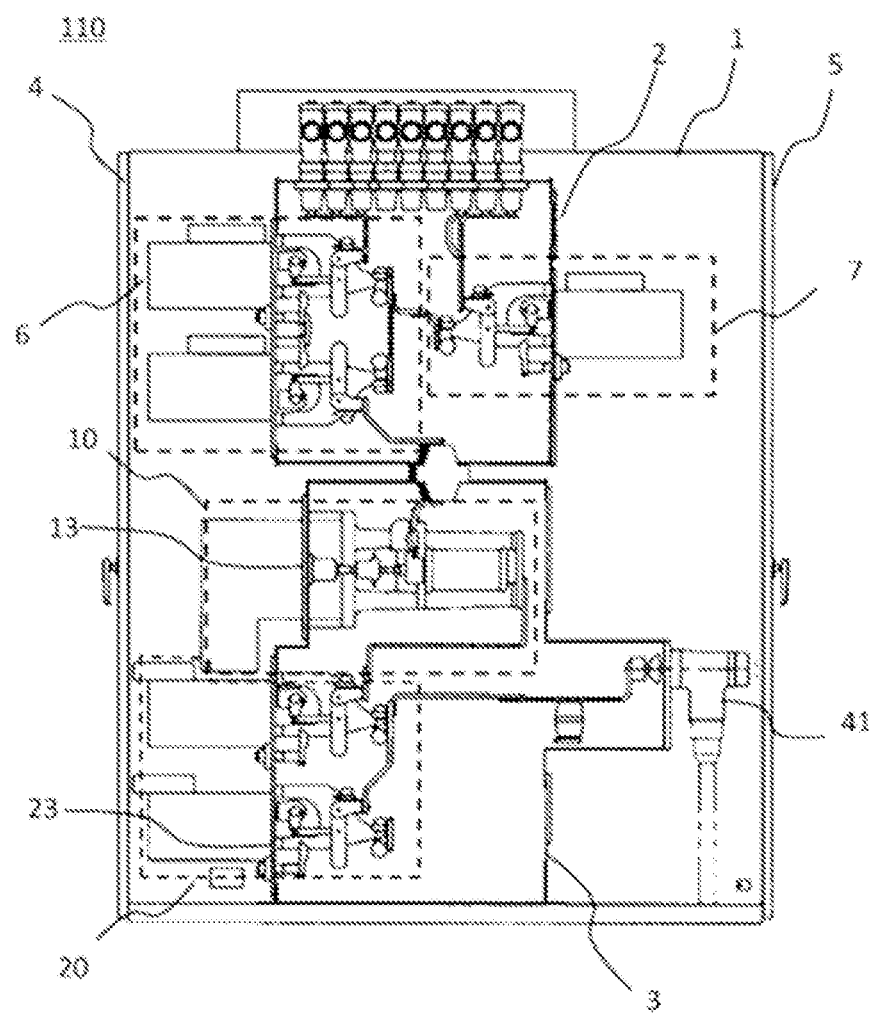
FIG. 5 is a side sectional view of a gas-insulated switchgear in embodiment 2.

FIG. 5 is a side sectional view of a gas-insulated switchgear 110 according to embodiment 2 of the present disclosure.

In the gas-insulated switchgear 120 shown in FIG. 4, on the side surface of the lower sealed container 3, the circuit breaker unit 10 and the ground switch unit 20 are arranged in line on the same plane as seen from the operation door 4 side, via the respective flange portions 13, 23.

In such arrangement of the device units in the gas-insulated switchgear 120, the protrusion 15 formed on the operation mechanism 14 of the circuit breaker unit 10 and storing the spring operation mechanism, and the circuit board 25 on the operation mechanism 24 of the first ground switch unit 21, contact and interfere with each other, and therefore it is necessary to arrange the circuit breaker unit 10 and the ground switch unit 20 with a widened interval therebetween.

On the other hand, in the gas-insulated switchgear 110 of embodiment 2, as shown in the side sectional view of the gas-insulated switchgear 110 in FIG. 5, the circuit breaker unit 10 and the ground switch unit 20 are attached to the side surface of the lower sealed container 3, and this is the same as in the gas-insulated switchgear 120 shown in FIG. 4.

However, in embodiment 2, the flange portion 13 of the circuit breaker unit 10 is located on the back side relative to the flange portion 23 of the ground switch unit 20 as seen from the operation door 4 side, and thus the circuit breaker unit 10 is placed at a position shifted backward.

Of the ground switch unit 20, in general, the circuit board 25 placed on the operation mechanism 24 of the first ground switch unit 21 can be transferred to a desired position on the operation mechanism 24.

Therefore, the circuit breaker unit 10 is placed backward as seen from the operation door 4 side and the circuit board 25 on the operation mechanism 24 is placed on a side close to the operation door 4, whereby the protrusion 15 of the circuit breaker unit 10 and the circuit board 25 of the first ground switch unit 21 can be prevented from contacting with each other and thus interference therebetween can be avoided. As a result, the circuit breaker unit 10 and the ground switch unit 20 can be arranged with a narrowed interval therebetween.

Since the interval between the circuit breaker unit 10 and the ground switch unit 20 is narrowed, the gas-insulated switchgear 120 can be downsized, and at the same time, conductors connecting from the power cable 41 to the ground switch unit 20 and the like can be shortened, whereby power loss is reduced and heat generation in the gas-insulated switchgear 120 can be suppressed.

In the gas-insulated switchgears 100, 110 shown in FIG. 1 and FIG. 5, arrangement of the circuit breaker unit 10 and the ground switch unit 20 for performing switching of the main circuit or the like has been described as an example.

At the side surface of the sealed container 3 in the gas-insulated switchgear 100, 110, device units such as an instrument transformer unit and an arrester unit may be placed, and the circuit breaker unit including the operation mechanism 14 having the protrusion 15 may be used for the instrument transformer unit, the arrester unit, and the like. Also in this case, by forming a step on the side surface of the sealed container 3, the interval between the circuit breaker unit and other device units can be narrowed, whereby the gas-insulated switchgear 100, 110 can be downsized and heat generation in the gas-insulated switchgear 100, 110 can be suppressed by reduction of power loss and the like.

Although the disclosure is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

DESCRIPTION OF THE REFERENCE CHARACTERS 1 device housing
2 sealed container
3 sealed container
4 operation door
5 back door
6 ground switch unit
7 back-side ground switch unit
10 circuit breaker unit
12 main circuit part
13 flange portion
14 operation mechanism
15 protrusion
16 vacuum interrupter
20 ground switch unit
21 ground switch unit
22 main circuit part
23 flange portion
24 operation mechanism
25 circuit board
26 disconnector terminal
27 movable conductor
28 ground terminal
31 ground switch unit
32 main circuit part
34 operation mechanism
35 circuit board
37 movable conductor
38 ground terminal
41 power cable
42 arrow
43 arrow
100 gas-insulated switchgear
110 gas-insulated switchgear
120 gas-insulated switchgear

The invention claimed is:

1. A gas-insulated switchgear comprising:
a device housing having an operation door;
a sealed container placed inside the device housing, the sealed container having a stepped side surface facing the operation door;
a circuit breaker unit attached, via a first flange portion, to a first step of the stepped side surface of the sealed container so as to be opposed to the operation door; and
a ground switch unit attached, via a second flange portion, to a second step of the stepped side surface of the sealed container so as to be opposed to the operation door, wherein
the first and second flange portions are attached to the sealed container such that a distance from the first flange portion to the operation door and a distance from the second flange portion to the operation door are different from each other.

2. The gas-insulated switchgear according to claim 1, wherein
the distance from the second flange portion to the operation door is longer than the distance from the first flange portion to the operation door.

3. The gas-insulated switchgear according to claim 2, wherein
the circuit breaker unit and the ground switch unit are attached at upper and lower positions to the sealed container so as to avoid contact between a protrusion of an operation mechanism of either the circuit breaker unit or the ground switch unit and an operation mechanism of another one of the circuit breaker unit or the ground switch unit.

4. The gas-insulated switchgear according to claim 2, wherein
the circuit breaker unit and the ground switch unit are attached at upper and lower positions to the sealed container so as to avoid contact between a protrusion of an operation mechanism of either the circuit breaker unit or the ground switch unit and a circuit board placed on an operation mechanism of another one of the circuit breaker unit or the ground switch unit.

5. The gas-insulated switchgear according to claim 2, wherein
the circuit breaker unit and the ground switch unit are attached at upper and lower positions to the sealed container so as to avoid contact between a protrusion of a main circuit part of either the circuit breaker unit or the ground switch unit and a main circuit part of another one of the circuit breaker unit or the ground switch unit.

6. The gas-insulated switchgear according to claim 1, wherein
the distance from the first flange portion to the operation door is longer than the distance from the second flange portion to the operation door.

7. The gas-insulated switchgear according to claim 6, wherein
the circuit breaker unit and the ground switch unit are attached at upper and lower positions to the sealed container so as to avoid contact between a protrusion of an operation mechanism of either the circuit breaker unit or the ground switch unit and an operation mechanism of another one of the circuit breaker unit or the ground switch unit.

8. The gas-insulated switchgear according to claim 6, wherein
the circuit breaker unit and the ground switch unit are attached at upper and lower positions to the sealed container so as to avoid contact between a protrusion of an operation mechanism of either the circuit breaker unit or the ground switch unit and a circuit board placed on an operation mechanism of another one of the circuit breaker unit or the ground switch unit.

9. The gas-insulated switchgear according to claim 6, wherein
the circuit breaker unit and the ground switch unit are attached at upper and lower positions to the sealed container so as to avoid contact between a protrusion of a main circuit part of either the circuit breaker unit or the ground switch unit and a main circuit part of another one of the circuit breaker unit or the ground switch unit.

10. The gas-insulated switchgear according to claim 1, wherein
the circuit breaker unit and the ground switch unit are attached at upper and lower positions to the sealed container so as to avoid contact between a protrusion of an operation mechanism of either the circuit breaker unit or the ground switch unit and an operation mechanism of another one of the circuit breaker unit or the ground switch unit.

11. The gas-insulated switchgear according to claim 1, wherein
the circuit breaker unit and the ground switch unit are attached at upper and lower positions to the sealed container so as to avoid contact between a protrusion of an operation mechanism of either the circuit breaker unit or the ground switch unit and a circuit board placed on an operation mechanism of another one of the circuit breaker unit or the ground switch unit.

12. The gas-insulated switchgear according to claim 1, wherein
the circuit breaker unit and the ground switch unit are attached at upper and lower positions to the sealed container so as to avoid contact between a protrusion of a main circuit part of either the circuit breaker unit or the ground switch unit and a main circuit part of another one of the circuit breaker unit or the ground switch unit.

13. A gas-insulated switchgear comprising:
a device housing having an operation door;
a sealed container placed inside the device housing; and
a circuit breaker unit and a ground switch unit attached, via first and second flange portions, respectively, to the sealed container so as to be opposed to the operation door, wherein
the first and second flange portions are attached to the sealed container such that a distance from the first flange portion to the operation door and a distance from the second flange portion to the operation door are different from each other, wherein
the circuit breaker unit and the ground switch unit are attached at upper and lower positions to the sealed container so as to avoid contact between a protrusion of an operation mechanism of either the circuit breaker unit or the ground switch unit and a circuit board placed on an operation mechanism of another one of the circuit breaker unit or the ground switch unit.

* * * * *